UNITED STATES PATENT OFFICE.

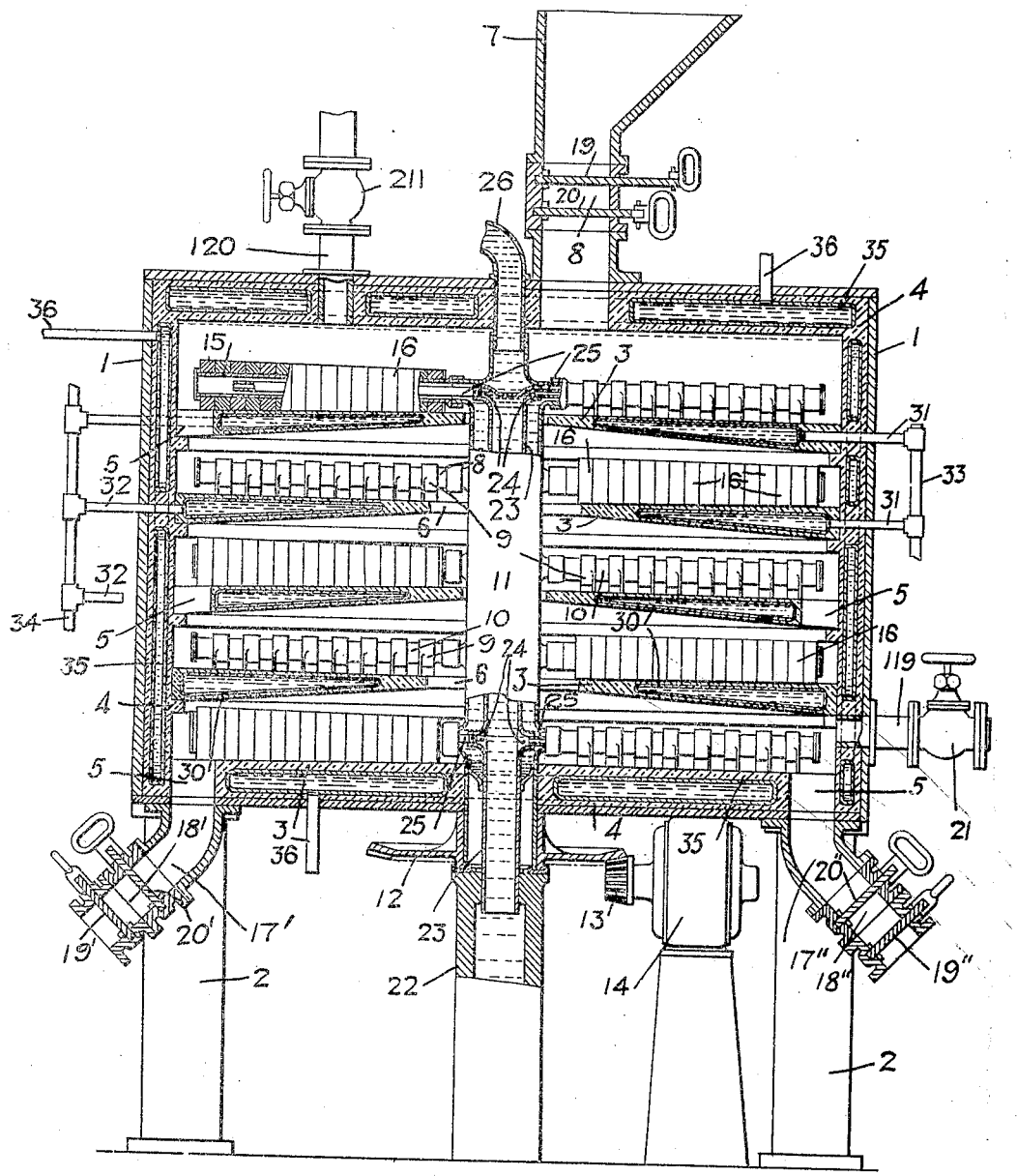

WALTER O. SNELLING, OF LONG ISLAND CITY, NEW YORK.

METHOD FOR PERFORMING CHEMICAL REACTIONS.

1,397,609.  Specification of Letters Patent.  Patented Nov. 22, 1921.

Application filed September 7, 1916. Serial No. 118,842.

*To all whom it may concern:*

Be it known that I, WALTER O. SNELLING, a citizen of the United States, and a resident of Long Island City, in the county of Queens and State of New York, have invented certain new and useful Improvements in Methods for Performing Chemical Reactions, of which the following is a specification.

My invention relates to chemical manufactures involving reactions between solid substances and gases or vapors, and it has for one of its objects to provide an improved method of performing such reactions in an effective and substantially continuous manner.

In my copending application for Letters Patent, filed March 24, 1916, Serial No. 86,373, of which the present application is a continuation in part, I have described a method of producing ammonia by passing a stream of dry, pulverulent calcium cyanamid, or other salt of cyanamid, in counter-current relation to a current of superheated steam, fresh supplies of calcium cyanamid being constantly added and the reaction products continuously removed. This method of progressively advancing solid reaction material in contact with a gaseous or vaporous reagent may also be applied to the treatment of other kinds of solid reaction materials with gases and vapors.

Apparatus suitable for carrying out my invention may be of many forms, the essential requirements of such apparatus being that solid reaction material, preferably in pulverulent form, is caused to advance in contact with an oppositely directed current of a gaseous or vaporous reagent, the solid material being preferably disposed in thin sheets and constantly stirred during its treatment. Such apparatus is illustrated in the accompanying drawing, the single figure of which is a vertical sectional view. Other features which I may employ with advantage are devices for regulating the temperature of the reaction, the pressure of the gas or vapor, and the speed at which the materials are passed through the reaction apparatus.

The single figure of the drawing is a vertical sectional view of a machine adapted to carry out my invention.

Reference may now be had to the accompanying drawing, which shows a reaction device comprising a cylindrical casing 1 supported upon standards 2 and containing a series of superposed shelves 3. The casing 1 is preferably provided with a refractory and chemically inert lining 4 of firebrick or other suitable material, and the shelves 3 should be composed of similar material. Alternate shelves are provided with peripheral openings 5, while the remaining shelves are provided with central openings 6, and all of the shelves are inclined slightly downward toward their peripheral or central openings.

Solid material, in fragmentary or pulverulent form, is introduced into the apparatus through a hopper 7, controlled by a valve 8, and is forced in a zigzag path across the shelves 3, being alternately pushed outward toward the openings 5 and inward toward the openings 6 by means of rakes or rabbles 9, which are carried upon hollow arms 10 that extend radially from a central hollow shaft 11 and revolve therewith. The shaft 11 carries at its lower end a bevel gear wheel 12 meshing with a bevel pinion 13 on the armature shaft of a driving motor 14.

I prefer that the arms 10 carrying the rakes or rabbles 9 be alternated with other radial arms 15 carrying chaser rolls 16, which serve to crush the solid material during the reaction and to constantly expose fresh surfaces. The combined action of the rabbles 9 and the chaser rolls 16 insures very thorough agitation of the material under treatment. The solid reaction products are discharged from the bottom of the apparatus through suitable chutes 17' 17'', etc., controlled by means of valves 18' 18'', etc.

For the purpose of introducing gaseous or vaporous reagents into the treating apparatus, I provide one or more inlet pipes 119 communicating with the interior of the casing 1 just above the lower shelf 3. I also provide an outlet pipe 120 extending through the top of the casing 1. The passage of fluid through both the inlet and outlet pipes is controlled by means of valves 21 and 211, by suitable manipulation of which the pressure within the apparatus may be regulated, to provide either uniform or non-uniform pressure within different portions of the treating chamber. It will be evident that the pressure to which the reaction materials are subjected may be either normal, superatmospheric or subatmospheric.

The inlet valve 8 and the discharge valves

18′ 18″, etc., are preferably so constructed that reaction materials may be charged into the apparatus, and the reaction products removed therefrom, without substantially changing the pressure within the reaction chamber. As shown, each of these valves comprises an outer sliding gate 19′, 19″, etc., and an inner gate 20′, 20″, etc. Granular or powdered reaction material is placed in the hopper 7 and the gate 19 is withdrawn, allowing some or all of the material to fall upon the gate 20. The gate 19 is then closed and the gate 20 is opened, thus permitting the material to fall upon the upper shelf 3. By operating the gates 19′, 19″, etc. and 20′ 20″, etc. of discharge valves 18′ 18″, etc. in a similar manner, the solid reaction products may be removed from the chutes 17′, 17″, etc., without substantially changing the pressure in the treating chamber.

In order to control the temperature within the reaction apparatus, I provide means for introducing heating or cooling fluid into the radial arms 10 and 15 and also into the interior of the shelves 3. For this purpose, the hollow shaft 11 rests upon and in axial alinement with a stationary tubular support 22, through which water, steam or other suitable heating or cooling fluid may be introduced into a pipe 23 that is supported centrally within the hollow shaft 11 and rigid therewith. The pipe 23 is provided with lateral openings 24 communicating with horizontal tubes 25, one of which extends into each of the hollow arms 10 and 15. The heating or cooling fluid, after circulating through the pipes 25, 10 and 15, is discharged into the annular space between the shaft 11 and the pipe 23, and is removed from the apparatus through a pipe 26 communicating with the upper end of the tube 23. The direction of fluid flow may obviously be reversed, if desired, the fluid being introduced through the pipe 26 and removed through the pipe 22.

The shelves 3 are made hollow to receive annular fluid containers 30, which may suitably be made of sheet metal and which are provided with inlet and outlet pipes 31 and 32. Steam, water or other heating or cooling fluid is supplied to all of the inlet pipes 31 by means of a pipe 33 and the fluid discharged through the pipes 32 is removed by means of a discharge pipe 34.

To provide more complete temperature control, the side, top and bottom walls of the apparatus may be provided with jackets 35 having a suitable number of inlet and outlet pipes 36. The fluid containers 30 and the jackets 35 may be connected to each other and to the source of fluid supply in various ways, to maintain either uniform or non-uniform temperature within the apparatus. In some cases it is advisable to keep the several shelves at progressively varying temperatures, which may either increase or decrease from top to bottom of the apparatus, depending upon the reaction being performed.

In the operation of the apparatus which I have shown and described, solid reaction material, preferably in as finely divided condition as possible, is charged into the machine through the hopper 7 and the double valve 8, and is subjected to repeated crushing and stirring by means of the rabbles 9 and the chaser rolls 16, while being moved in a zig-zag path over the shelves 3. At the same time, reagent gas or vapor is introduced into the casing through the pipe 119 at any desired pressure, which is regulated in accordance with the nature of the material under treatment, the pressure of the fluid reagent being controlled by means of the valves 21 and 211. As indicated above, the gaseous and vaporous products of the reaction, and any excess of the gaseous or vaporous reagent that may be employed, are removed through the pipe 120, while the solid reaction products are discharged from time to time through the valve 18′, 18″, etc.

My apparatus and process may be utilized for carrying out many different chemical reactions. In the manufacture of ammonia from calcium cyanamid, for example, dry and pulverulent calcium cyanamid or other salt of cyanamid may be very conveniently treated with steam according to this method and by means of this apparatus, the ammonia and waste steam being withdrawn through the outlet pipe 120 and the steam condensed. In the subjoined claims which relate specifically to the preparation of ammonia, the expression alkali earth cyanamid is intended to include both alkali earth cyanamids and the salts of cyanamid commonly known by the names "lime nitrogen" "cyanamid" and "nitrolime", these being commercial products containing varying quantities of true alkali earth cyanamid.

Another advantageous application of my invention is found in cases where a solid material cannot be conveniently brought into solution before being treated with a gaseous or vaporous reagent. When chemical reactions are to be produced between a solid and a gas or vapor, it has heretofore been usual, when possible, to take up the solid in a suitable solvent and to pass the solution through a coke tower or similar absorption apparatus in contact with the gaseous reagent. There are many cases where this method is not available, either because the solid is insoluble in the available solvents or because the solid material reacts with the solvent. In such cases, my method and apparatus are particularly useful, the solid material being treated directly with the gas or vapor.

An example of such a reaction is found in the production of sodium salicylate by treating sodium phenate with carbon dioxid. In performing this reaction, I feed sodium phenate in a dry, powdered condition into the apparatus, in countercurrent relation to a stream of carbon dioxid under pressure. I prefer to maintain a pressure of carbon dioxid in the apparatus of about 120 pounds per square inch, and to maintain a temperature of about 150° C. within the apparatus. The sodium phenate is advanced through the apparatus at such a rate that the finished product, sodium salicylate, is discharged from the treating chamber after about six hours from the time when the sodium phenate is introduced. Still better results can be obtained by heating the several shelves of the apparatus to different temperatures, the entering phenate being spread upon a shelf heated to about 120° C., while the other shelves are kept at progressively higher temperatures, the treatment on the bottom shelf being at about 160° C.

Another useful application of my invention is in the manufacture of formates, by treating finely powdered sodium hydroxid, soda lime, or other solid containing free alkali metal hydroxid, with moist carbon monoxid under a pressure of about 120 pounds per square inch and at a temperature of from 170° C. to 190° C., approximately. In this case also I find it advantageous to regulate the temperatures of the treating shelves in accordance with the state of completion of the reaction, the top shelf being preferably maintained at 170° C., the intermediate shelves at 175° C., 185° C. and 190° C. respectively, and the final sodium formate being withdrawn from the bottom shelf maintained at 195° C. to 200° C. The solid material may suitably be passed through the treating apparatus in about five hours. Producer gas may be used instead of pure carbon monoxid, in which case the gas should contain about 30% of carbon monoxid and about 70% of nitrogen, and should be freed from most of its carbon dioxid content by passing the gas through a caustic soda washer or the like.

It is to be understood that the specific materials and reactions to which I have referred are mentioned by way of illustration only, and are not to be construed as limiting my invention. It is also to be understood that the steps of my method may be variously modified, and the structural details of my apparatus considerably varied, without exceeding the limits of my invention or the scope of the appended claims.

I claim as my invention:

1. The process of making ammonia that comprises progressively advancing alkali earth cyanamid in contact with an aqueous fluid.

2. The process of making ammonia that comprises progressively advancing dry alkali earth cyanamid in contact with superheated steam.

3. The process of making ammonia that comprises progressively advancing alkali earth cyanamid in the presence of a counter-current of aqueous fluid.

4. The process of making ammonia that comprises progressively advancing dry, pulverulent calcium cyanamid in the presence of a counter-current of superheated steam.

5. The process of making ammonia that comprises progressively advancing finely divided alkali earth cyanamid in the presence of a counter-current of steam, withdrawing the liberated ammonia and excess steam, and condensing the withdrawn steam.

In testimony whereof, I have hereunto subscribed my name this 5th day of September, 1916.

WALTER O. SNELLING.